(12) United States Patent
De Castro et al.

(10) Patent No.: US 6,226,430 B1
(45) Date of Patent: May 1, 2001

(54) HIGH MECHANICAL AND HEAT PERFORMANCE OPTICAL CABLE

(75) Inventors: Dráusio De Castro, Sorocaba; Edison Castro, São Caetano do Sul; Marcelo Valente Giacaglia, Sorocaba; Marco Antonio Scocco, Salto, all of (BR)

(73) Assignee: Pirelli Cabos S.A., Santo Andre (BR)

( * ) Notice: Subject to any disclaimer, the term of this patent is extended or adjusted under 35 U.S.C. 154(b) by 0 days.

(21) Appl. No.: 09/242,634
(22) PCT Filed: Aug. 13, 1997
(86) PCT No.: PCT/BR97/00041
§ 371 Date: May 3, 1999
§ 102(e) Date: May 3, 1999
(87) PCT Pub. No.: WO98/08124
PCT Pub. Date: Feb. 26, 1998

(30) Foreign Application Priority Data

Aug. 21, 1996 (BR) .................................................. 9604130

(51) Int. Cl.⁷ ...................................................... G02B 6/44
(52) U.S. Cl. ........................... 385/113; 385/101; 385/104; 385/106; 385/112
(58) Field of Search .............................. 385/100–114, 101, 385/113, 105, 107, 135

(56) References Cited

U.S. PATENT DOCUMENTS

| 5,133,034 |   | 7/1992 | Arrovo et al. ..................... 385/107 |
| 5,229,851 | * | 7/1993 | Rahman ................................ 385/114 |
| 5,305,411 |   | 4/1994 | Arrovo ................................. 385/109 |
| 5,455,881 |   | 10/1995 | Bosisio et al. ...................... 385/100 |
| 5,751,880 | * | 5/1998 | Gaillard ............................... 385/109 |

FOREIGN PATENT DOCUMENTS

| 0 528 653 B1 | 2/1993 | (EP) . |
| 0 613 033 B1 | 8/1994 | (EP) . |
| 0 632 301 B1 | 1/1995 | (EP) . |

* cited by examiner

*Primary Examiner*—Phan T. H. Palmer
(74) *Attorney, Agent, or Firm*—Finnegan, Henderson, Farabow, Garrett & Dunner, L.L.P.

(57) ABSTRACT

A high mechanical and heat performance optical cable for aerial or underground applications comprises a dielectric central member, a plurality of polymeric tubes helically arranged around the dielectric central member, a plurality of optical fiber loosely housed in the polymeric tubes and separated from the polymeric tubes by a filling, a binder comprising polymeric tapes helically arranged around the tubes, a peripheral pulling element arranged around the polymeric tubes, a flame resistant external sheath surrounding the peripheral pulling element, and metallic elements helically arranged around the flame resistant external sheath to form an external ring.

5 Claims, 1 Drawing Sheet

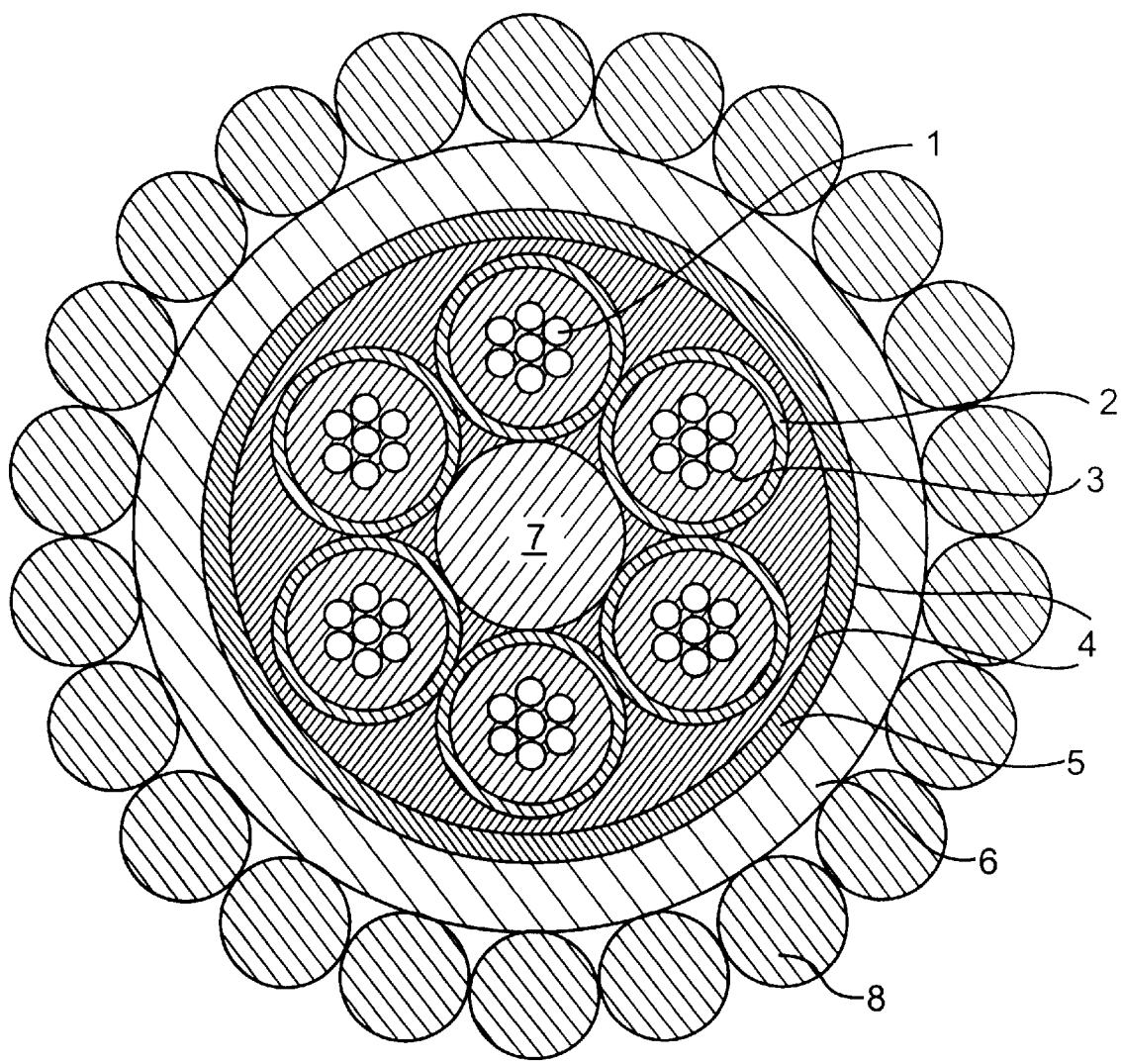

HIGH MECHANICAL AND HEAT PERFORMANCE OPTICAL CABLE

BACKGROUND OF THE INVENTION

Field of the Invention

The present invention refers to an optical cable, preferably for aerial applications. However it can also be used underground and has high mechanical and heat performance properties because of its construction.

Optical cables in aerial networks are installed in electrical power distribution networks of medium and low tension or in its own pole line, in urban and rural areas. In rural areas, accidents frequently occur with optical cables, due to fire caused by natural or forced burning of local vegetation and also caused by hunter's shots.

Other important aspects of aerial optical cables are the installation conditions, i.e., maximum distance between poles and sag, climatic conditions, etc., which must be seriously taken into account.

Therefore, an object in the design of aerial optical cables is to meet the above mentioned installation conditions, as well as, when necessary, to withstand heat conditions caused by the above-mentioned fires or the mechanical damage caused by hunter's guns, without damaging the fibers or altering their optical characteristics.

In the market there are different types of totally dielectric aerial optical cables, which have several advantages over the traditional solutions of metallically sheathed cables, which use corrugated or smooth aluminium or steel tapes. However, principally from the resistance point of view against fires and gun shots, the dielectric solutions exhibit a low performance and complexity in the production process.

Furthermore, the construction of totally dielectric aerial optical cables, to be installed with large spans, requires a great number of textile pull elements so as to resist the mechanical stress in the climatic and more critical installation conditions (e.g. maximum wind force, minimum temperature, etc.). This excessive number of textile elements, in addition to presenting difficulties in the cable's manufacturing cycle, increases the unit weight as well as the cable's outside diameter, making its dimensions more critical.

An alternative, having high efficiency and proven through various practical applications, is the use of lightning conductors optical cables (OPGW). These OPGW cables have exceptional optical and mechanical characteristics, since they have around their dielectric nucleus, where the optical fibers are housed, an aluminium tube and surrounding it one or more layers of metallic wires.

These cables are preferably indicated for new aerial installations in power transmission lines or replacing conventional lightning conductor cable, offering one of the highest security coefficients against accidents caused by different factors, including fire and gun shot.

These cables also have been used in distribution networks or their own pole lines, to take advantages of their exceptional optical and mechanical features. However, for these installations, this alternative is not always the best solution from the economical point of view.

SUMMARY OF THE INVENTION

In accordance with a preferred embodiment of the invention, a high mechanical and heat performance optical cable for aerial or underground applications comprises optical fibers housed with a dimensional clearance inside protective polymeric tubes, a filling, a peripheral pulling element, an external flame resistant sheath and helically applied metallic elements forming an external ring, the protection tubes being assembled around a central element of dielectric material, on a helicoid structure, via fastenings of polymeric wires and binding with helicoid shaped polymeric tapes.

The optical cable also preferably provides the use of water superabsorbent elements in the interstitial areas forming a dry nucleus.

Moreover, the optical cable preferably provides the use of heat resistant material in the binding such as polyaramide or fiber glass tapes.

As a result, the present invention provides an alternative, which is technically and economically viable, of an aerial optical cable project, so as to assure that the above-mentioned optical cable works according to the project's conditions and, therefore, guarantee the mechanical and optical integrity of the optical fibers, against anticipated mechanical stress and temperature limits. It also shows better performance regarding heat requirements resulting from fires, as well as impacts caused by gun shots.

To better understand the present invention, it will now be explained based on the following detailed description and accompanying drawing disclosing an embodiment of the above-mentioned optical cable.

BRIEF DESCRIPTION OF THE DRAWINGS

The accompanying drawing shows a preferred embodiment for the cable of the present invention.

DESCRIPTION OF PREFERRED EMBODIMENT

There are various structures used to house and protect optical fibers forming the optical cable nucleus. One of the structures most used is called loose tube type structure or fibers loose within a tube.

One or more optical fibers 1 are housed inside a polymeric tube 2, which has a dimensional clearance in relation to the optical fiber beam 1, that will result in a cross free play of the fibers.

The dimensions of tube 2 and the relative length of fiber 1 in its interior, in relation to the length of tube 2, are parameters which are estimated so as to meet the requirements of the lengthening and contraction of the optical cable.

To form the optical nucleus, these tubes are gathered around a central element 7, which can be manufactured of various materials and, usually, work as the strengthening member or mechanical support. When the optical cable has metallic elements on its outside, these central elements 7 must be of dielectric material, in order to avoid electrical discharges. The gathering of the tubes 2 on central elements 7 can be screw-shaped, forming an open or close propeller. This technique is called SZ gathering.

This screw-shaped structure gives the fibers 1 a radial movement margin, because of the lengthening or contraction of the optical cable.

On tube structure 2 gathered around central element 7, usually polymeric wire fastenings and binding 4 with polymeric tapes, also screw-shaped, are used. They assure stability of the structure and the linking of tubes 2 to central element 7.

To protect the fibers from contact with humidity, the loose tubes 2 and the interstitial areas 3 are filled with a viscous polymeric gel. However, the present invention also provides for the use of a dry nucleus, i.e., with no gel filling in the interstitial area 3 of the loose tubes 2, which are still kept filled so as to protect the optical fibers 1.

In this case, to protect the optical nucleus, against water penetration and spreading in these interstitial areas 3, the present invention uses water superabsorbent elements. These materials can be used on the central element 7 and on the gathered tubes 2, in order to block all possible routes. One of the ways of use, which must not be considered the only one, is the use of a longitudinal wire applied on the central element 7, positioned under the gathered tubes 2, and a tape helically applied on the optical nucleus.

One of the advantages of having a dry nucleus is minimizing the weight of the cable, as well as the internal pressure caused by the filling gel, arising from increases in temperature, in the possible situations in which this occurs.

To offer better features regarding mechanical traction, these cables can be reinforced by the use of elements such as high pull textile wires, which are strung over the optical nucleus or laid longitudinally on the sheath.

As an external protection for this central nucleus, called the cable's optical nucleus, additional protections are applied which can only be dielectric of polymeric materials, metallic or compounds of metallic (typically aluminium or steel) and polymeric material. Each type of material or compound is used to offer specific features in the cables for specific applications.

In the present invention, the optical cable nucleus is totally dielectric, being coated by one or more layers of polymeric material and the outermost is flame resistant. Further it is possible to use heat resistant material bindings, such as polyaramide or glass fiber tapes.

To attain a better performance of the cable under fire and heat requirements, as well as against impacts caused by guns, as mentioned above, the present invention provides the application over this flame resistant coated nucleus of metallic elements 8 helically applied, forming an external ring.

These metallic elements can be manufactured of various materials, such as aluminium, steel, aluminium coated steel (alclad), etc., and can have various shapes, such as cylindrical, rectangular, trapezoidal, etc.

When this metallic frame is applied on the coated nucleus, techniques can be used to assure its better adhesion on the polymeric coating, amongst them, for example, the use of adhesives or heat process.

The metallic frame is preferably also responsible for the cable's mechanical support in the most critical conditions of installation and climatic conditions, in order to optimize the design, from the cost/benefit point of view.

The use of this optical cable in aerial networks does not have any kind of special requirement during the installation and operational phases. Therefore, it is an efficient alternative for the available solutions.

The present invention also can be applied in underground installation, inside tubing or directly buried, having as an advantage an effective protection against attack by rodents, a typical problem of dielectric cables.

Although the preferred embodiments of the present invention have been described and illustrated, it is obvious to those skilled in the art that several modifications can be applied without departing from the principles of the invention.

What is claimed is:

1. A high mechanical and heat performance optical cable for aerial or underground applications, comprising:
    a dielectric central member;
    a plurality of polymeric tubes helically arranged around the dielectric central member;
    a plurality of optical fibers housed in the polymeric tubes and separated from the polymeric tubes by a filling;
    a binder comprising polymeric tapes helically arranged around the tubes;
    a peripheral pulling element arranged around the polymeric tubes;
    a flame resistant external sheath surrounding the peripheral pulling element; and
    metallic elements helically arranged around the flame resistant external sheath to form an external ring.

2. An optical cable according to claim 1, wherein the filling comprises a water superabsorbent element.

3. An optical cable according to claim 1, wherein the binder comprises a heat resistant material.

4. An optical cable according to claim 1, wherein the binder comprises a polyaramide tape.

5. An optical cable according to claim 1, wherein the binder comprises a fiberglass tape.

* * * * *